United States Patent [19]

Pelletier

[11] Patent Number: 4,763,226
[45] Date of Patent: Aug. 9, 1988

[54] CONNECTING BLOCKS AND MOUNTING ARRANGEMENTS FOR TELEPHONE SYSTEMS

[75] Inventor: Claude Pelletier, Laval, Canada

[73] Assignee: Northern Telecom Limited, Montreal, Canada

[21] Appl. No.: 52,924

[22] Filed: May 22, 1987

[51] Int. Cl.[4] ............................................. H01R 9/24
[52] U.S. Cl. ................................. 361/426; 379/329; 439/131; 439/142
[58] Field of Search ................................ 361/417–420, 361/426–429; 379/328–330; 439/131, 142

[56] References Cited

U.S. PATENT DOCUMENTS

| | | | |
|---|---|---|---|
| 3,784,728 | 1/1974 | De Bortoli et al. | 361/426 |
| 4,150,867 | 3/1979 | Knickerbocker | 361/426 |
| 4,581,489 | 3/1986 | Nozick | 379/329 |
| 4,618,194 | 10/1986 | Kwilos | 379/329 |

FOREIGN PATENT DOCUMENTS 2428783  2/1975  Fed. Rep. of Germany ...... 361/426

Primary Examiner—Philip H. Leung
Assistant Examiner—Gregory D. Thompson
Attorney, Agent, or Firm—R. J. Austin

[57] ABSTRACT

A connector block and mounting arrangement with a block housing having a rear with a rigid upper element and a lower flexible element spaced from the upper element. A mounting member is engageable with the upper element to support the block and a latching feature is included to latch the mounting member to the lower flexible element.

7 Claims, 2 Drawing Sheets

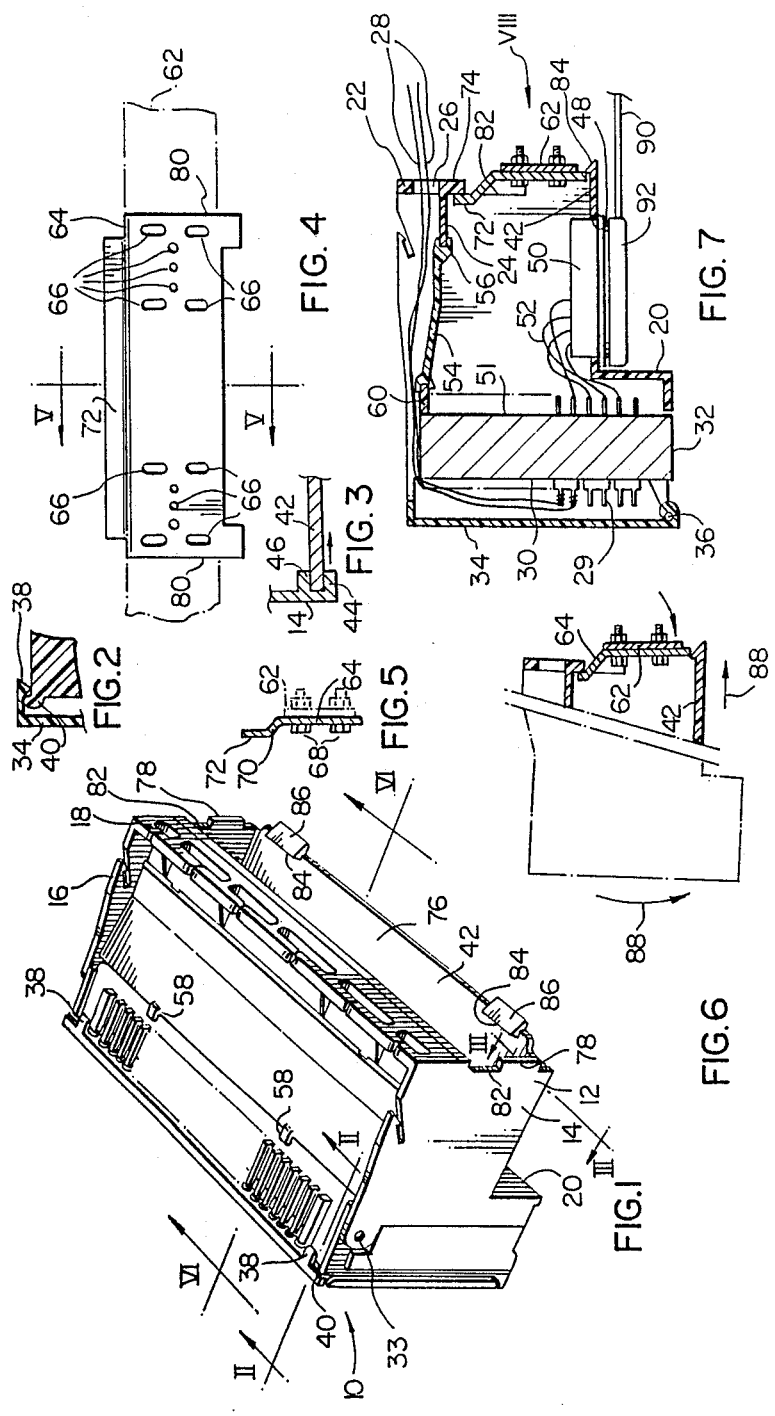

CONNECTING BLOCKS AND MOUNTING ARRANGEMENTS FOR TELEPHONE SYSTEMS

FIELD OF THE INVENTION

This invention relates to connecting blocks for telephone systems.

BACKGROUND OF THE INVENTION

Connecting blocks for telephone systems are used in a variety of locations and the design of any particular block depends upon its use. For use in central office locations, connecting blocks comprise a housing carrying a terminal support member through which a matrix of electrical terminals extend. Incoming conductor wires extend to the terminals on one face, i.e. the rear face, of the support member and outgoing conductor wires extend from the terminals at the other or front face. The housing conventionally has side walls extending between a front and a rear of the housing and at the front of the housing the terminal support member is carried. The connector block is normally mounted upon a central office framework by screws passing through a rear plate of the housing and into a framework member. It is a long established problem with connecting blocks that difficulty has been found with mounting the blocks upon the central office frameworks because the screw positions tend to be virtually inaccessible for manual screw location. An unwarranted amount of time is therefore spent in mounting connector blocks upon central office frameworks and also in dismounting them. The difficulty is increased by the obstructed presence of cables and conductor wires passing around connector block positions and also through the connector blocks during mounting and dismounting processes.

SUMMARY OF THE INVENTION

The present invention provides a connector block and a mounting arrangement which seeks to overcome the above problem.

A connector block according to the present invention has a terminal support member carried at a front of a housing, side walls of which extend from front to the rear of the housing. A rigid upper element extend across the rear of the housing and a lower resiliently flexible element extends across the rear and is spaced from the upper element. A mounting member for the connector block engages the rigid upper element to support the weight of the block and a latching means is provided for interengaging the mounting member and the lower flexible element. This interengagement is made possible by a resilient flexing movement of the lower element to hold the block upon the mounting member with the mounting member engaged with the rigid upper element. The latching means allows for detachment of the block from the mounting member.

With the use of the arrangement according to the invention, the mounting member may form part of a framework in a central office or may be an individual mounting member for the connecting block and having means enabling it to be mounted upon a central office framework. As may be seen with the mounting member forming part of or secured to the framework, then the connector block may be simply located into position upon the mounting means by location of the connector block appropriately relative to the mounting means whereby the mounting means engages the rigid upper element and is held in position also by the latching means. The resilient flexing movement of the lower element under pressure applied to it through the latching means by the mounting member allows the mounting member to move forwardly to enable the latching operation to take place. For removal of the connecting block, it is merely necessary to lever the lower element in a downward direction so as to resiliently flex it whereby the latching means no longer holds the connecting block onto the mounting member. The connector block may then be withdrawn.

As may be seen from the arrangement of the invention and for the reasons discussed above, a difficult mounting operation is avoided.

In preferred arrangements, the upper and lower elements provide a gap between them and the mounting member with the connector block attached thereto substantially fills the gap.

BRIEF DESCRIPTION OF THE DRAWINGS

One embodiment of the invention will now be described, by way of example, with reference to the accompanying drawings, in which:

FIG. 1 is an isometric view of a connecting block taken from the rear;

FIGS. 2 and 3 are cross-sectional views along lines II—II and III—III in FIG. 1 and showing details;

FIG. 4 is a front elevational view upon a mounting member for the connector block showing the mounting member in position relative to a central office framework member;

FIG. 5 is a cross-sectional view taken along line V—V in FIG. 4;

FIG. 6 is a cross-sectional view through the connector block taken along line VI—VI in FIG. 1 and showing the connector block during its assembly onto the mounting member;

FIG. 7 is a cross-sectional view at the same location as FIG. 5 and showing the connecting block in its final assembled position and also showing more detail than in FIG. 6;

DETAILED DESCRIPTION

Figure 8:
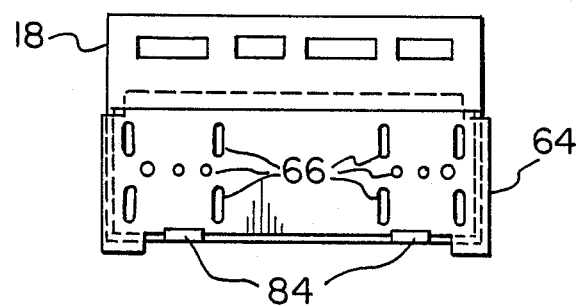
FIG. 8 is a view from the rear of the assembly of block and mounting member, taken in the direction of arrow VIII in FIG. 7.

A connecting block 10 of the embodiment, as shown in FIG. 1, comprises a housing 12 formed from molded plastic parts. The housing 12 has two side walls 14 and 16 which are identical but of opposite hand, the side walls extending from a rear towards a front of the housing. The side walls are integrally formed during molding together with a rear rigid upper element 18 and a lower forwardly positioned element 20 extending between the side walls. The rear rigid element 18 has a vertical section 22 (FIG. 7) and a lower horizontal section 24 which extends forwardly. The vertical section 22 has a series of apertures 26 (FIGS. 1 and 7) disposed above the horizontal section 24, the apertures provided for passage therethrough of outgoing conductor wires 28 from terminals at the front face 30 of a terminal support member 32. The terminal support member is pivotally mounted at an upper position 33 (see FIG. 1) at each side to the sides 14 and 16 and in a normal position, the terminal support member extends across an open front of the housing as shown in FIGS. 1 and 7.

The terminal support member 32 is provided with a front cover 34 which is hingedly attached to the support member at a hinge position 36 at a lower side of the cover. The cover is held in a closed position by reception of latches 38 at the top edge of the cover over ribs 40 formed on a side edge of the terminal support member 32. This is shown by FIG. 1 and also by FIG. 2.

The housing also includes a lower resiliently flexible element which extends across the rear and is spaced from the upper element 18. This lower element is in the form of a horizontal base 42 of the housing (FIGS. 3, 6 and 7), the base being detachable from the side walls 14 and 16 and interlockable therewith. As shown in the section in FIG. 3, the side wall 14 has a lower horizontal edge flange 44 and a flange 46 spaced slightly above it so as to accommodate the thickness of the base 42. The side wall 16 is similarly formed. The base 42 is assembled into position by sliding it forwardly between the flanges 44 and 46 of both side walls (i.e. through the plane of FIG. 3), the side walls being positioned apart so as to allow for a friction fit of the base between them. The base is formed with one or more recesses 48 for acceptance therethrough of one part 50 of a mating electrical connector (i.e. commonly known as a "ribbon" connector). This part 50 may be screwed onto the base or attached by any other suitable means. The terminals in the part 50 are wired to the terminals 29 at the back face 51 of the terminal support member by wires 52.

At the top of the housing as shown in FIG. 7, a molded plastic top cover 54 is provided. At a rear edge, the top cover has two or more longitudinally spaced downwardly extending fingers 56 which are spaced from an edge of the top cover so as to provide a groove for snapping reception of the horizontal portion 24 of the rear rigid element 18. Similarly, a forward edge of the cover is formed with two upwardly extending fingers 58 (see FIG. 1) which are spaced from a lower edge of the cover (FIG. 7) to define a groove which accepts a rearward extension 60 from the pivoted side of the terminal support member 32. The cover 54 may be snapped into its covering position shown by FIG. 7 with the terminal support member 32 in an operative position shown in FIGS. 1 and 7 in which it covers the open front of the housing.

The connector block 10 may be mounted upon a member 62 of a central office framework by a mounting member 64 (FIGS. 4 and 5). The mounting member 64 is a rigid metal plate provided with a plurality of holes and slots 66 by which the mounting member may be detachably assembled to different types of framework. In this embodiment, the member 64 is assembled to the framework member 62 by screw threaded means, i.e. nut and bolt assemblies 68 shown in FIG. 5. An upper edge portion of the member 64 is bent out of the plane of the member. A lower part 70 of this bent portion is angled relative to the plane of the member 64 while the upper portion 72 lies in a plane substantially parallel to the plane of the member.

As can be seen from FIG. 7, the rear upper element 18 of the housing has a downwardly extending rigid lip 74 which is spaced from the base plate 42 so as to provide a gap 76 (FIG. 1). The mounting member 64 is mountable within the gap 76 so as to substantially close it with a rear face of the upper portion 72 engaged with a forward face of the rigid lip 74 of the upper element 18.

The mounting member 64 is longer than the distance between housing sides 14 and 16 (FIG. 8) so that in a mounted condition, lower rear edges 78 of the sides abut against the forward facing surface of the member 64, these rear edges thereby forming an abutment means in a lower region of the housing for this purpose. To enable the upper portion 72 of member 64 to be passed into the housing, the upper portion terminates short of each end 80 of member 64. Also, to allow for relative tilting of the housing and mounting member 64 during their assembly and disassembly, a recess 82 is provided at each rear edge of the sides 14 and 16 directly beneath the lip 74 (FIGS. 1 and 7).

To hold the mounting member in position within the gap 76, i.e. to retain the connecting block upon the mounting member, a latching means is provided for holding the mounting member within the rear edge of the base 42 of the housing. This latching means comprises two latches 84 which lie close to opposite ends of the rear edge of the base and have rearwardly and upwardly facing surfaces 86 (see FIG. 1). In certain cases, a single latch along the edge of the base may be sufficient.

The connecting block may be assembled onto the mounting member either before or after connection of the incoming and outgoing wires into the terminals 29. Even in a case where the terminals are connected to the wires, no problem is associated with mounting the block in position because it is unnecessary to locate screw threaded means between the wires and through the housing. With the block in either the wired or unwired condition, it is mounted upon the mounting member 64 merely by passing the upper portion 72 of the mounting means through the gap 76, locating the rear surface of the mounting member in abutting engagement with the forward facing surface of the rigid lip 74 and then pivoting the connecting block downwardly as indicated by the arrows 88 in FIG. 6. By this means, the sloping surfaces 86 of latches 84 are urged against the lower edge of the mounting member. As the upper portion 72 of the member 64 is passed through the gap 76, portions of the ends of the member 64 adjacent the upper portion move into the recesses 82 (FIG. 6) as member 64 is longer than the distance between housing sides 14 and 16 as already mentioned with reference to FIG. 8. As the pivoting movement continues, the latches are forced downwardly against the mounting member to enable the latches to pass behind the mounting member from the position in FIG. 6 to that of FIG. 7. The downward movement of the latches is accomplished by a flexing of the base 42 of the housing. Upon reaching the position of FIG. 7, the base then resiliently returns to its planar condition to move the latches behind the mounting member 64 thereby holding it to the housing and filling the gap 76. This is also clear from FIG. 8. It is worthy of note that during flexing of the base, its method of attachment between the flanges 44 and 46 of the side walls enables the base to flex without causing significant movement of the side walls. This is because the base may move in an outward direction relative to the flanges, as shown by the arrow in FIG. 3, sufficiently to cause the latches to engage behind the mounting member without removal of the base from between the flanges.

In the final assembled position of the connecting block onto the mounting member and the framework, an incoming cable 90 is connected to another mating part 92 of the mating connector which is joined to the part 50 already assembled into the base.

To remove the connecting block from the mounting member 64, it is simply necessary to prise the base 42 downwardly (for instance by insertion of a screw driver between the base and the mounting member) at a location between the latches 84 and provide the appropriate downward movement. The connecting block is then pivoted in the opposite direction from that shown in FIG. 6 to enable it to be moved away from the mounting member 64. It can be seen therefore that the arrangement, as discussed in the embodiment and also according to the invention, provides a convenient and simple method of assembly of a connector block onto a central office framework.

Figure 9:
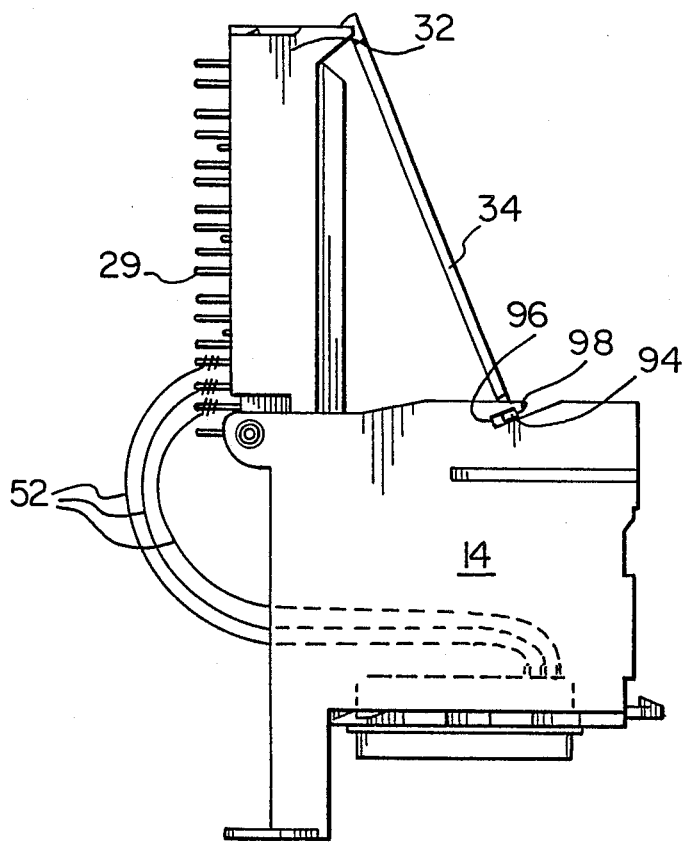
FIG. 9 is a side elevational view of the connecting block and showing a terminal support member of the block in a raised position during a wiring operation.

In FIGS. 1 and 7, the terminal support member 32 lies in a position extending across the open front of the housing and may be detachably held there by a simple latch arrangement (not shown). In this position the top cover 54 also assists in covering the inside of the housing and enshrouding the wires 52 together with the rear face of the terminal support member. When it is required to connect wires 52 to the terminals 29 at the rear face 51 of the support member, the support member is moved into a second position so that the rear face faces forwardly. This is shown in FIG. 9. To achieve this position, it is necessary to detach the cover 54. The cover 34 is then pivoted about hinge position 36 from the closed position of the cover over the front face of the support member, as shown in FIGS. 1 and 7, and into an open position. The support member 32 is then pivoted in a clockwise direction about its pivotal upper position 33 so that it moves through the chain-dotted outline position in FIG. 9 and into the upper full outline position in FIG. 9. As the support member 32 reaches its upper position shown by FIG. 9, then the cover is pivoted upon the support member until flanges 94 at the two sides of the cover remote from its hinge position are positioned so as to be slidable down two inclined slots 96 formed into the upper surface of the two side walls 14 and 16. This movement continues until the flanges move beyond resilient latches 98 so as to hold the cover and thus the terminal support member 32 in the position shown in FIG. 9. The terminals 29 are then easily accessible for connection or disconnection of the wires 52.

What is claimed is:

1. A connector block and mounting arrangement comprising a connector block having a housing and a terminal support member carried at a front of the housing, the housing having side walls extending from the front to a rear of the housing and including at the rear of the housing a rigid upper element extending across the rear and a lower resiliently flexible element also extending across the rear and spaced from the upper element to define a gap in the housing, the upper element having a downward rigid lip;

the arrangement also including a mounting member which is engageable with the rigid upper element by reception of the mounting member through the gap between the upper and lower elements and against a forward surface of the lip to support the weight of the block, and a latching means to enable interengagement of the mounting member with the lower flexible element by a resilient flexing movement of the lower element to hold the block in a detachable manner upon the mounting member with the mounting member engaged with the rigid upper element.

2. An arrangement according to claim 1 wherein the mounting member is an individual mounting member for the block, the mounting member having means enabling it to be mounted upon a framework.

3. An arrangement according to claim 1 wherein the mounting member comprises a planar plate having and edge portion bent out of the plane of the plate to engage the forward surface of the lip.

4. An arrangement according to claim 1 wherein the latching means comprises at least one latch disposed along an edge of the lower element, the latch being engageable with the mounting member by a resilient flexing of the lower element which allows the mounting member to pass beyond and forwardly of the latch whereby the lower element may resiliently move to position the latch behind the mounting member, the housing having abutment means in a lower region to engage a forward facing surface of the mounting member.

5. An arrangement according to claim 4 wherein the side walls of the housing have lower rear edges which comprise the abutment means.

6. An arrangement according to claim 4 wherein the lower element forms part of a base of the housing, the base being connectable to the two side walls to permit a degree of relative movement between the base and the side walls and allow for resilient flexing of the base without substantial movement of the side walls.

7. An arrangement according to claim 1 provided with a top cover for the housing, the top cover being interlockable with the upper element and with the terminal support member.

* * * * *